L. HEISEL.
ANTIFREEZING TANK.
APPLICATION FILED JUNE 10, 1909.
957,557.
Patented May 10, 1910.
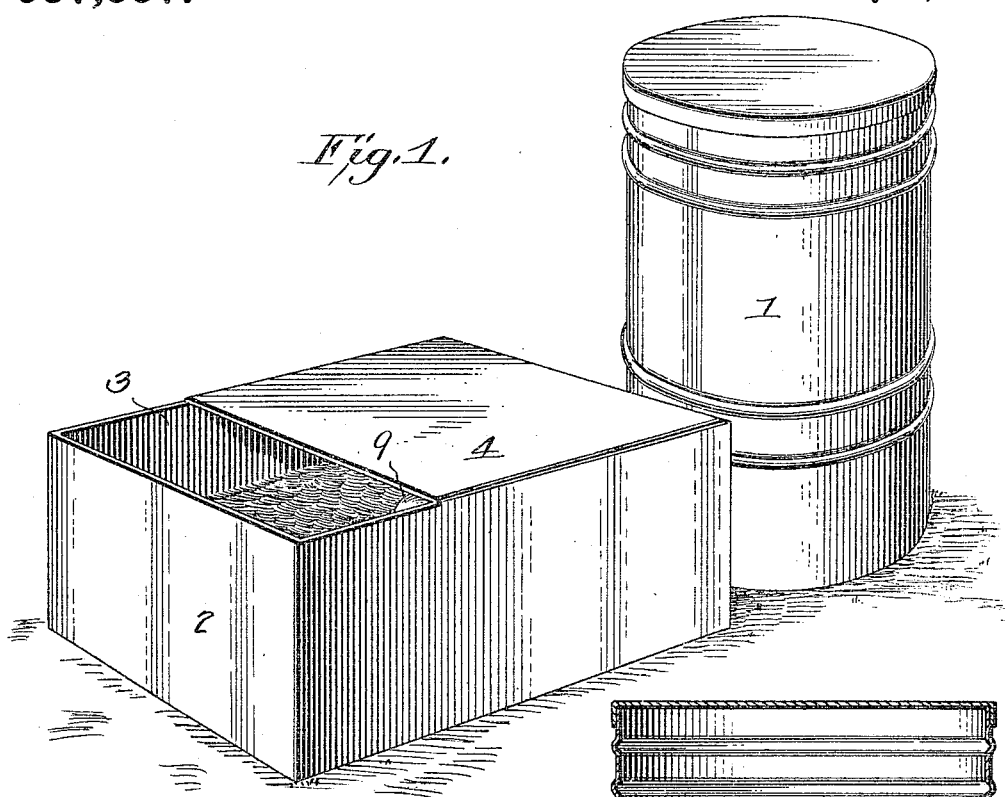
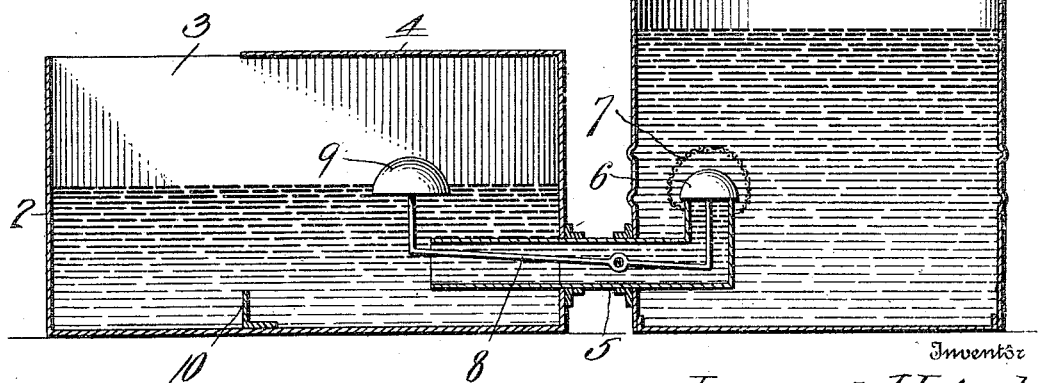
Witnesses
Oliver M. Holmes
E. B. McBath
Inventor
Leonard Heisel
By O'Meara & Brock
Attorney

UNITED STATES PATENT OFFICE.

LEONARD HEISEL, OF FREMONT, IOWA.

ANTIFREEZING-TANK.

957,557. Specification of Letters Patent. Patented May 10, 1910.

Application filed June 10, 1909. Serial No. 501,362.

*To all whom it may concern:*

Be it known that I, LEONARD HEISEL, a citizen of the United States, residing at Fremont, in the county of Mahaska and State of Iowa, have invented a new and useful Improvement in Antifreezing-Tanks, of which the following is a specification.

This invention relates to watering troughs, and especially to a trough designed for watering hogs, and the object of the invention is a trough in which the water is automatically held at the desired level, and which is protected so that the water in the trough will not freeze during the winter.

I am aware of the fact that a number of automatic troughs have been placed upon the market but I have found by experimenting with a number of them that they would not operate in cold weather owing to the freezing of the water, which of course prevented the mechanism regulating the flow of water from operating and I have also found that it is practically impossible in a watering trough for hogs to prevent the accumulation of a certain amount of mud in the trough and this also frequently clogs some part of the mechanism designed to regulate the flow of water.

The object of my invention is to overcome these disadvantages and thereby insure the steady operation of the device.

My invention consists of the novel features of construction hereinafter described, pointed out in the claim and shown in the accompanying drawings, in which, Figure 1 is a perspective view of my device. Fig. 2 is a vertical section.

In these drawings 1 represents a suitable tank or reservoir in which a supply of drinking water is kept and which may be filled in any desired manner. Located adjacent this tank is a drinking tank 2, the end opposite the tank being open as shown at 3 so that the stock to be watered can gain access at any time to the water in the trough. The remainder of the trough is covered as shown at 4. A pipe 5 connects the tank and trough extending part way into each and being angled upwardly at its inner end, that is within the tank 1. A suitable valve 6 is mounted upon an upwardly angled inner end portion of a pivoted rod 8 and is adapted to seat upon and close the upper inner end of the pipe 5. To prevent sediment from accumulating beneath the valve 6 and interfering with its operation it is protected by an inclosing screen 7. The rod 8 is pivoted within the pipe 5 and at a point nearest the inner end so as to allow for an increased leverage and movement of a float 9 carried by the outer upwardly angled portion of the rod, which float rises and falls with the water level in the trough. When the water level reaches its predetermined height thus bringing the float 9 to its highest point the outer end of the rod 8 is lifted and the inner end depressed thus drawing the valve 6 downwardly and closing the inner end of the pipe 5. When the water level falls in the tank 2 the corresponding fall of the float 9 will lift the valve 6 thus admitting an additional supply of water to the trough. To prevent the accumulation of mud into the covered portion of the trough and beneath the float 9 a transverse partition 10 of any desirable height is placed in the trough and substantially in vertical alinement with the rear edge of the open portion of the trough.

The partition 10 serves as a stop to prevent mud from passing to the rear end of the trough and the protecting cover 4 which extends over the greater portion of the trough prevents the freezing of the water around the float 9, which would of course interfere with its operation. I have found by experience that a tank and trough constructed as herein shown and described can be operated in the State of Iowa during the winter time without the formation of ice in the trough to a sufficient extent to interfere with its operation, while during the same period of time troughs not so protected would become useless owing to the freezing of the water in them.

What I claim is:—

The combination with a tank, of a trough, a cover extending over the greater portion of the trough, a pipe connecting said covered portion with the tank, a transverse partition arranged substantially in vertical alinement with the front end of the covered portion, said partition being of less height than the trough, the said pipe having its inner end portion upwardly angled, a rod pivotally mounted in said pipe having upturned end portions, a valve carried by the inner end of the rod, and a float carried by the outer end.

LEONARD HEISEL.

Witnesses:
E. E. AUSTIN,
G. F. DONLEY.